(12) United States Patent
Mendonca

(10) Patent No.: US 7,590,738 B2
(45) Date of Patent: Sep. 15, 2009

(54) METHOD AND SYSTEM FOR PROCESSING CONCURRENT EVENTS IN A PROVISIONAL NETWORK

(75) Inventor: John Mendonca, Redwood City, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 610 days.

(21) Appl. No.: 10/975,278

(22) Filed: Oct. 27, 2004

(65) Prior Publication Data

US 2006/0089986 A1 Apr. 27, 2006

(51) Int. Cl.
*G06F 15/16* (2006.01)
(52) U.S. Cl. .................. 709/226; 709/227; 709/228; 709/229; 710/200; 711/154; 719/321; 370/390
(58) Field of Classification Search .............. 709/226, 709/227, 228, 229; 710/200; 711/154; 719/321; 370/390
See application file for complete search history.

(56) References Cited

U.S. PATENT DOCUMENTS

| | | | |
|---|---|---|---|
| 6,145,061 A * | 11/2000 | Garcia et al. ............ 711/154 |
| 6,330,604 B1 * | 12/2001 | Higuchi et al. ........... 709/226 |
| 6,446,125 B1 * | 9/2002 | Huang et al. ............ 709/226 |
| 6,473,849 B1 * | 10/2002 | Keller et al. ............. 712/30 |
| 6,523,066 B1 * | 2/2003 | Montroy et al. .......... 709/229 |
| 6,735,200 B1 * | 5/2004 | Novaes ................... 370/390 |
| 7,117,273 B1 * | 10/2006 | O'Toole et al. .......... 709/252 |
| 7,213,093 B2 * | 5/2007 | Hammarlund et al. ... 710/200 |
| 2002/0087736 A1 * | 7/2002 | Martin .................... 709/312 |
| 2003/0093579 A1 * | 5/2003 | Zimmer et al. .......... 709/318 |
| 2005/0102681 A1 * | 5/2005 | Richardson ............. 719/321 |

* cited by examiner

*Primary Examiner*—Jinsong Hu

(57) ABSTRACT

A method and system for processing concurrent events in a provisional network that comprises a plurality of dynamically allocatable nodes. Specifically, the method includes receiving notification of an event associated with a node in the provisional network. The event requires processing a new lifecycle operation to update a status of the node in the provisional network. Then, it is determined whether the node is locked for processing an active lifecycle operation that is associated with a concurrent event for the node. Processing of the new lifecycle operation is suspended until the active lifecycle operation has terminated, if the node is locked. The lock is maintained on the node after the active lifecycle operation has terminated. Thereafter, the new lifecycle operation is processed when the active lifecycle operation has terminated.

23 Claims, 6 Drawing Sheets

METHOD AND SYSTEM FOR PROCESSING CONCURRENT EVENTS IN A PROVISIONAL NETWORK

TECHNICAL FIELD

The various embodiments of the present invention relate to data centers of computing resources. More specifically, various embodiments of the present invention relate to the processing of concurrent events for a particular resource in a data center.

BACKGROUND ART

Modern networking continues to provide an improvement in communication and information access. As an example, in-house data centers, associated with a particular entity or interrelated group of users, could contain a large number of information technology (IT) resources that are interconnected through a network. The in-house data center can allocate, de-allocate, modify, and clone farms of computing resources. A controller monitors the actions of the computing resources and provides an operational status for each of the computing resources for the in-house data center.

DISCLOSURE OF THE INVENTION

A method and system for processing concurrent events in a provisional network that comprises a plurality of dynamically allocatable nodes. Specifically, the method includes receiving notification of an event associated with a node in the provisional network. The event requires processing a new lifecycle operation to update a status of the node in the provisional network. Then, it is determined whether the node is locked for processing an active lifecycle operation that is associated with a concurrent event for the node. Processing of the new lifecycle operation is suspended until the active lifecycle operation has terminated, if the node is locked. The lock is maintained on the node after the active lifecycle operation has terminated. Thereafter, the new lifecycle operation is processed when the active lifecycle operation has terminated.

BRIEF DESCRIPTION OF THE DRAWINGS

The above and other objects and advantages of the present invention will be more readily appreciated from the following detailed description when read in conjunction with the accompanying drawings, wherein.

Prior Art

BEST MODES FOR CARRYING OUT THE INVENTION

Figure 1:
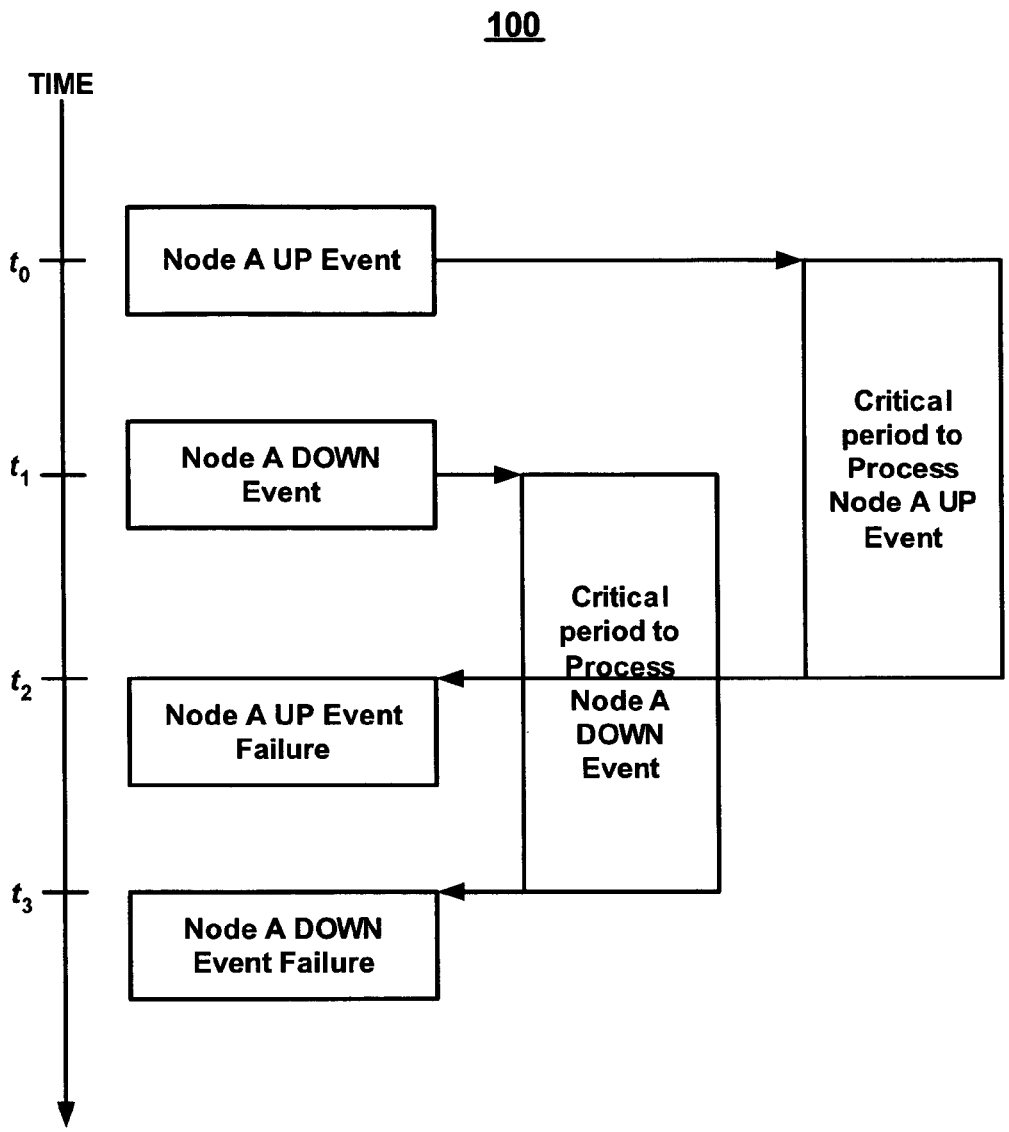
FIG. 1 is a diagram illustrating an error when processing concurrent events for a particular resource in a data center.

Reference will now be made in detail to embodiments of the present invention, a method and system for processing concurrent events in a provisional network that comprises a plurality of dynamically allocatable nodes (e.g., computing resources), examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims.

Furthermore, in the following detailed description of the present invention, numerous specific details are set forth in order to provide a thorough understanding of the present invention. However, it will be recognized by one of ordinary skill in the art that the present invention may be practiced without these specific details. In other instances, well known methods, procedures, components, and circuits have not been described in detail as not to unnecessarily obscure aspects of the present invention.

Embodiments of the present invention can be implemented on software running on a computer system. The computer system can be a personal computer, notebook computer, server computer, mainframe, networked computer, handheld computer, personal digital assistant, workstation, and the like. This software program is operable for processing concurrent events in a provisional network. In one embodiment, the computer system includes a processor coupled to a bus and memory storage coupled to the bus. The memory storage can be volatile or non-volatile and can include removable storage media. The computer can also include a display, provision for data input and output, etc.

Some portions of the detailed descriptions which follow are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "receiving," or "determining," or "suspending," or "processing," or "locking," or "unlocking," or "polling," or "queuing," or "reporting," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Accordingly, embodiments of the present invention provide a method and system for processing concurrent events in a provisional network that comprises a plurality of dynamically allocatable nodes. As a result, other embodiments of the present invention serve the above purpose and provide for the sequential processing of concurrent events on a node-by-node basis by implementing a locking mechanism. This results in proper processing of farm lifecycle operations associated with events occurring at a particular computing resource. Still other embodiments of the present invention serve the above purposes and further provide for the processing of multiple farm lifecycle operations for different computing resources in a farm in parallel for more efficient and quicker processing.

As will be described below, embodiments of the present invention are directed to a provisional network that comprises a plurality of dynamically allocatable nodes that is capable of processing concurrent events. The provisional network utilizes a programmable infrastructure that enables the virtual connection of any computing resource as well as the isolation of a set of computing resources, thereby ensuring the security and segregation of computing resources at the lowest infrastructure level. As such, the provisional network can create and manage a plurality of virtual farms, each of which utilize a set of computing resources in the provisional network.

Before considering the present invention further, first consider how certain conflict conditions can arise when resources are changed in the prior art. The status of computing resources are constantly changing as the computing resource is, for instance, turned on and off, allocated and de-allocated from a farm of resources, modified within a farm of resources, and cloned in a farm of resources. These events may occur at a particular resource and result in a change of status for that resource. As such, certain critical operations are processed by the controller to update the status of the resource within the data center. A conflict arises when concurrent events occur that change the status of a particular resource.

For example, each of the critical operations that are processed to update the status of a particular resource requires a critical period of time to complete successfully. If a new operation for updating a resource is started during processing of a concurrent operation for the same resource, the results of both operations will most likely not be successful. That is, the operations will not complete with the desired results.

FIG. 1 is a diagram 100 illustrating an exemplary concurrency error addressed using conventional techniques, where two or more requests attempting to change the status of the same resource at node A occur at virtually the same time. As shown in FIG. 1, at time t-0 the controller first receives a "node up" message for the computing resource at node A in a farm of computing resources. The "node up" message is associated with a node up event, in which the computing resource is coming on-line and being allocated for a particular farm. A critical period for executing operations for updating the status of the computing resource in association with the "node up" event begins at t-0 and ends at t-2.

Before the controller finishes processing the "node up" message, a "node down" message is also received at time t-1 for the same computing resource. That is, the "node down" message is associated with a node down event, in which the computing resource is going off-line and is being de-allocated from the same farm. As such, the controller begins processing the "node down" message in parallel with the "node up" message. Because both messages are processed in parallel, neither message completes successfully, as shown in FIG. 1, where a node A up event failure occurs at t-2, and a node A down event failure occurs at t-3.

Since neither event completes successfully, the farm associated with the computing resource is left in an undesirable state in the conventional art. That is, the controller may be unaware of the two failures associated with the "node up" and "node down" messages and may have an incorrect state for the computing resource. The results are unpredictable when processing concurrent events because various internal state information is changed as they are being accessed. This internal state information is needed to produce the outcome of each "node up" and "node down" operation. The internal state information needs to be accessed and changed only by one operation at a time to ensure proper results are achieved. The internal state information incorrectly influences the outcome of the operations when two or more message requests for processing overwrite each others intermediate results for the internal state information.

Concurrency errors may jeopardize the overall operation of the farm. In particular, incorrect status information for a particular resource may effectively bring that resource off-line. At the extreme, incorrect status information for a particular resource may propagate through the entire farm and affect the status information for all the resources associated with that farm, or even the entire in-house data center.

Figure 2:
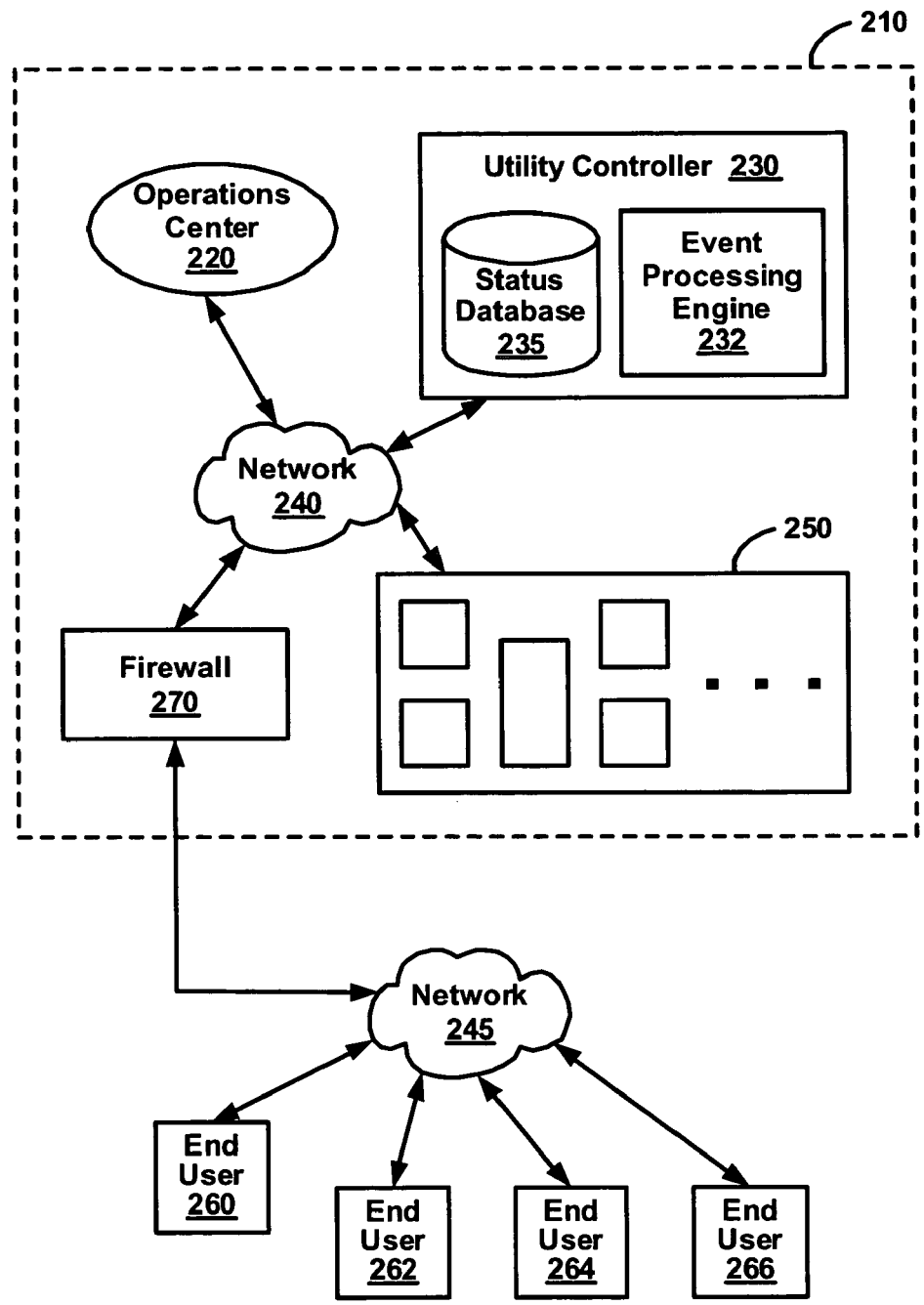
FIG. 2 is a block diagram illustrating a network system including a data center that is capable of processing concurrent events in an exemplary provisional network (e.g., utility data center) that comprises a plurality of dynamically allocatable nodes, in accordance with one embodiment of the present invention.

For purposes of illustration, FIG. 2 shows an exemplary provisional network that is a utility data center (UDC) that is capable of processing concurrent events associated with a single node, in accordance with one embodiment of the present invention. In FIG. 2, a block diagram of a networked system 200 illustrates the functionality of a UDC 210 with a plurality of end users, in accordance with one embodiment of the present invention. System 200 is comprised of the UDC 210 which is coupled through a network 245, such as, a virtual private network (VPN) or the Internet, to a plurality of end users (e.g., end users 260, 262, 264, 266, etc.) through the network 245. The UDC 210 is capable of processing concurrent events for the computing resources in the UDC 210.

The UDC 210 of FIG. 2 is comprised of an operations center 220 that is coupled through a network 240 (e.g., a local area network) to a utility controller 230, and a pool 250 of computing resources. The UDC 210 provides for a scalable and programmable solution for allocating computing resources that automates the creation, monitoring, and the metering of a wide variety of computing environments. That is, the UDC 210 provides operations to allocate, de-allocate, modify, and clone farms of computing resources, for example.

In one embodiment, the UDC 210 is a provisional UDC. As such, the UDC 210 utilizes a programmable infrastructure that enables the virtual connection of any computing resource as well as the isolation of a set of computing resources, thereby ensuring the security and segregation of computing resources at the lowest infrastructure level. As such, the UDC 210 can create and manage a plurality of virtual farms, each of which utilize a set of computing resources in the UDC 210.

The operations center 220 provides for overall control over the UDC 210. In one embodiment, the operations center 220 is manned by network technicians that monitor the management and allocation of computing resources in the UDC 210. The network technicians also provide for the installation and repair of physical resources in the pool 250 of computing resources. Also, the operations center acts as an interface between the UDC 210 and the plurality of end users. The operations center 220 can be coupled to the plurality of end users through the network 245. In addition, a firewall 270 can provide one form of additional security for the UDC 210 when communicating through the network 245.

The pool 250 of computing resources in the UDC 210 is comprised of a pre-wired, pre-integrated, and pre-tested plurality of physical resources that form a pool from which multiple farms can be created on demand. The computing resources include, but are not limited to, the following: servers, computers, appliances (e.g., load balancers and firewalls), network routers, network switches, network firewalls, storage area network switches, disk arrays, network elements, etc. The computing resources in the pool 250 are physically pre-wired (ideally a one-time wiring solution) and then dynamically, and logically re-wired into various virtual farm environments. The computing resources can be logically re-wired using virtual local area network technology (VLAN), in one embodiment.

In another embodiment, the UDC 210 supports multi-vendor and open system support for the plurality of computing resources in the pool 250. As such, the UDC 210 can provide support to computing resources in the pool 250 that have the same functionality (e.g., firewalls) but are provided by different vendors. Also, the UDC 210 can support the various operating systems that each of those computing resources may use.

The utility controller 230 enables the deployment segmentation, and management of resources and farms. The farms deployed with computing resources from the pool 250 can be tailored to meet a wide variety of services. Each farm has its own dedicated computing and appliance resources. The farms can share common resources, such as storage and networking fabric.

The utility controller 230 manages the pool 250 of computing resources in the UDC 210. Specifically, the utility controller 230 ensures the segmentation of farms, thereby securely isolating one farm from other farms. Also, the utility controller 230 monitors all deployed farms, and automatically re-deploys replacement resources if there are any failures in computing resources detected. In addition, the utility controller 230 monitors shared infrastructure resources, alerting the operations center of failures or other significant events, such as, intrusion attempts.

In one embodiment, the utility controller includes an event processing center 232 and a status database 235. In particular, the event processing center 232 is capable of performing operations, such as "farm lifecycle operations" that provide operations to allocate, de-allocate, modify, and clone farms of computing resources, for example, as previously described. As such, the event processing center 232 is able to monitor the dynamically changing status of computing resources in the pool 250 of computing resources. The status of each of the computing resources in the pool 250 of computing resources is maintained in the status database 235.

In one embodiment, the farm lifecycle operations are broken up into many smaller, automated sub-operations that are performed automatically by the utility controller 230 (e.g., software) in the UDC 210. As such, the UDC 210, and in particular the utility controller 230, is able to process many farm lifecycle operations and sub-operations simultaneously. Embodiments of the present invention provide for the simultaneous and parallel processing of operations of farm lifecycle operations associated with concurrent events at a single computing resource in a farm. Some lifecycle operations and sub-operations occur asynchronously without user intervention. For example, a farm server in a farm may be automatically re-provisioned due to hardware failure.

Figure 3:
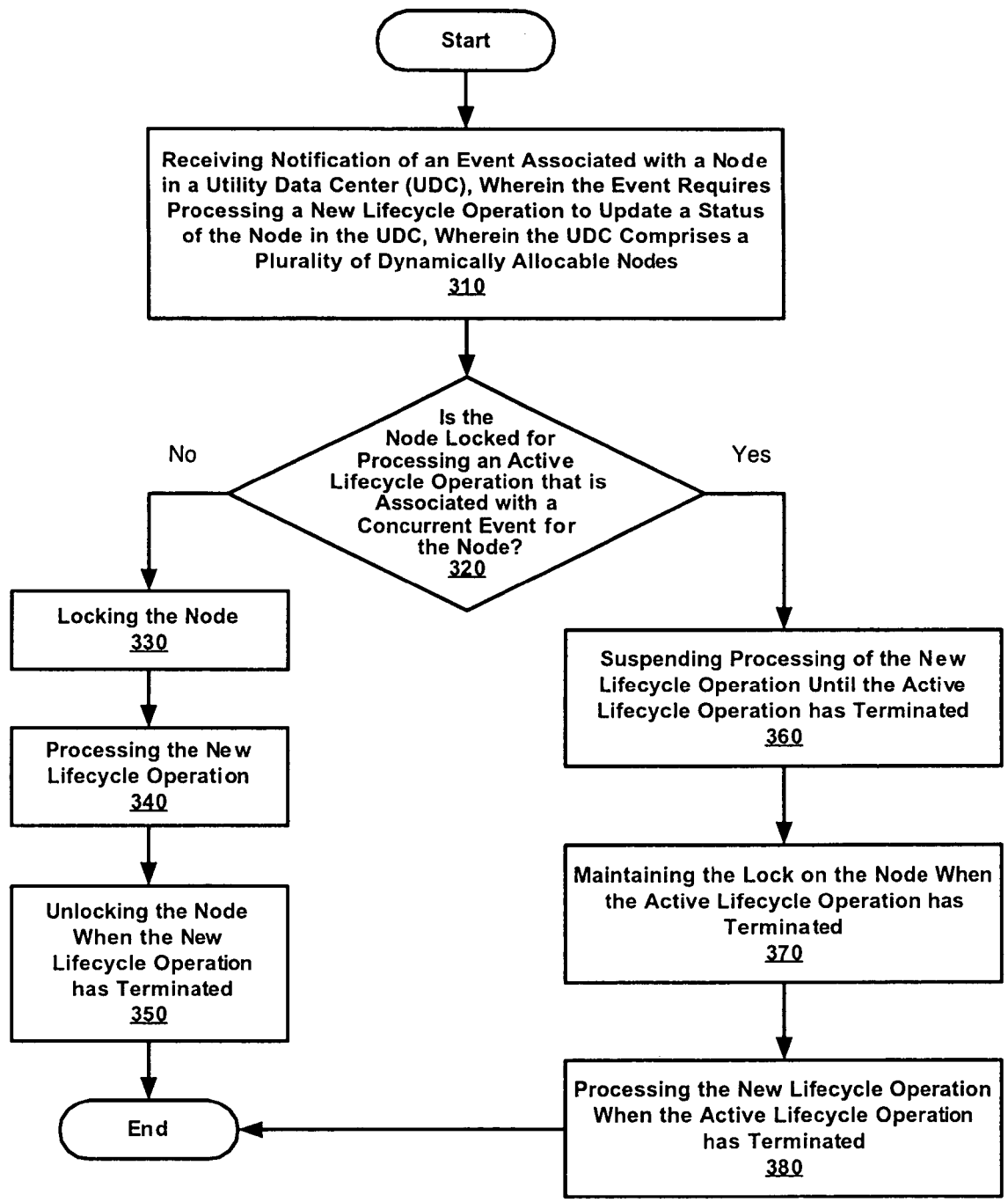
FIG. 3 is a flow chart illustrating steps in a computer implemented method for processing concurrent events in a provisional network that comprises a plurality of dynamically allocatable nodes, in accordance with one embodiment of the present invention.
Figure 4:
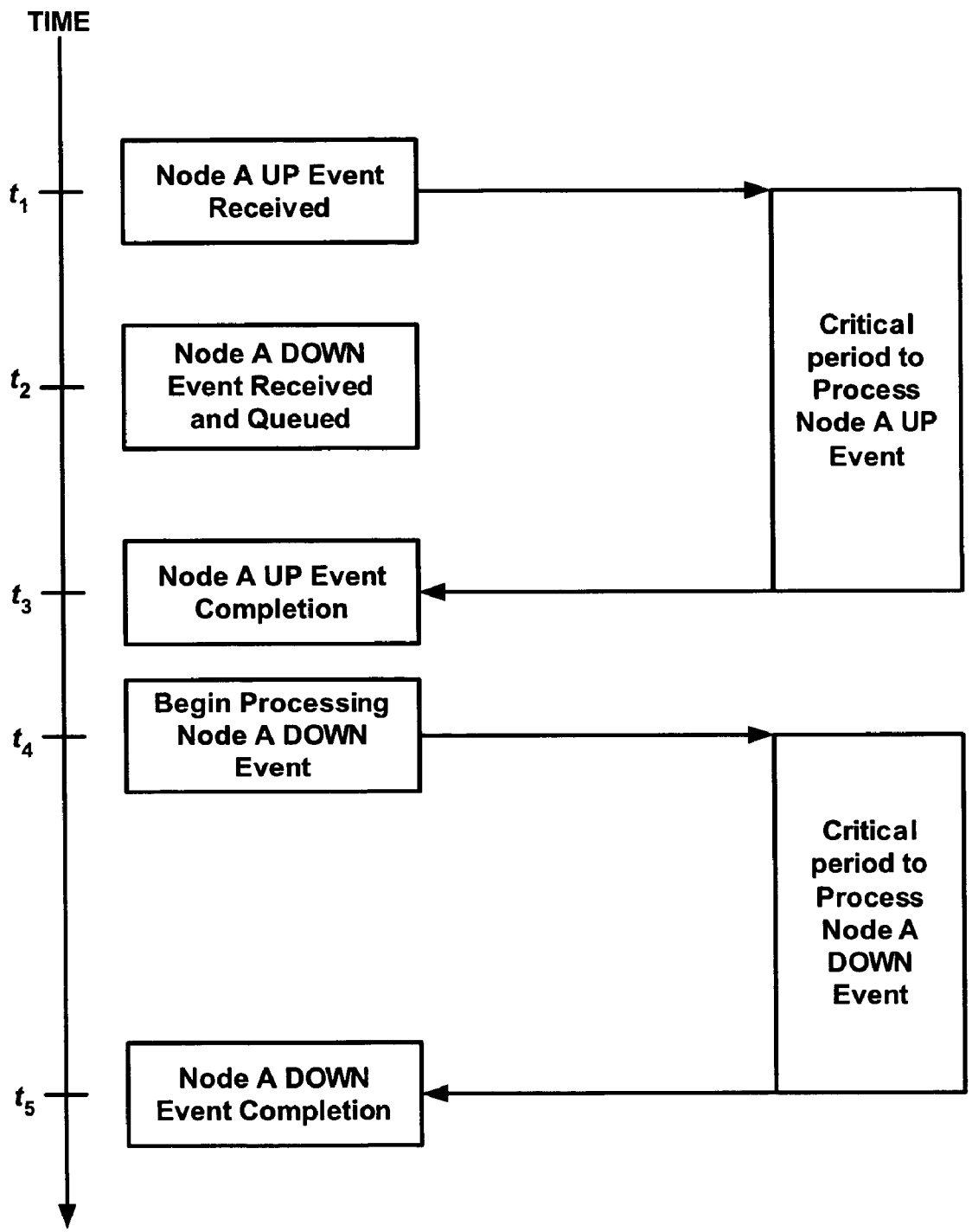
FIG. 4 is a flow chart illustrating steps in a computer implemented method for queuing events for processing in a provisional network that comprises a plurality of dynamically allocatable nodes, in accordance with one embodiment of the present invention.

FIGS. 3 and 4 in combination illustrate embodiments of the present invention that illustrate processing of concurrent events in a provisional network. In particular, FIG. 3 is a flow chart 300 illustrating steps in a computer implemented method for processing concurrent events in a provisional network that comprises a plurality of dynamically allocatable computing resources, in accordance with one embodiment of the present invention. FIG. 4 is a diagram 400 of an exemplary case of concurrent events that is provided for illustration only. In particular, FIG. 4 illustrates the sequential processing of concurrent events at a single node in a provisional network using the method of FIG. 3, in accordance with one embodiment of the present invention.

Turning now to FIG. 3, the method described in flow chart 300 provides for the sequential processing of concurrent events associated with a single computing resources. Specifically, flow chart 300 provides for the sequential processing of concurrent events at a controller (e.g., utility controller 230 in FIG. 2) in a provisional network. For instance, the processing of the events updates the status of the computing resource in the provisional network. As such, the controller is capable of processing multiple events for various computing resources in parallel.

At 310, the present embodiment receives notification of an event that is associated with a node (e.g., a computing resource) in a provisional network that includes a plurality of dynamically allocatable nodes. The event requires processing a new lifecycle operation to update the status of the node in the provisional network. For instance, as illustrated in FIG. 4, the event may consist of a DOWN event at time t-2 in which the computing resource associated with the node is being de-allocated from a farm of computing resources. Before processing the farm lifecycle operations associated with the received notification of the DOWN event, the present embodiment determines if other lifecycle operations are being conducted for the same computing resource in order to avoid parallel processing of concurrent events for the same computing resource.

In particular, at decision step 320, the present embodiment determines whether the node is currently locked. That is, the present embodiment determines if the node is locked in association with processing an active lifecycle operation that is associated with a concurrent event for the same node. Locking of the node during the processing of a lifecycle operation associated with an event ensures sequential processing of concurrent events.

If the node is not locked, the present embodiment proceeds to 330 and locks the node. Locking of the node is accomplished in order to prevent parallel processing of another event received thereafter.

At 340, the present embodiment processes the new lifecycle operation. Since the node is locked, the new lifecycle operation can be processed completely without interruption. That is, the new lifecycle operation is not processed in parallel with any other concurrent events.

At 350, the present embodiment unlocks the node when the new lifecycle operation has terminated. This prevents a permanent locking of the node. In this way, future events requiring processing of lifecycle operations can be processed more efficiently.

Returning now to 320, if the node is locked, the present embodiment proceeds to 360. The node is locked in order to process an active lifecycle operation that is associated with a concurrent event. Notification of the concurrent event was received prior to the notification of the event in 310.

For instance, in FIG. 4, notification of the concurrent event associated with the processing of the active lifecycle operation was received at time t-1. As such, upon receipt of the node A UP event, the present embodiment locks node A in order to process the node A UP event without interruption. That is, the node A UP event is processed sequentially in relation to processing of other events, such as the receipt of the notification of the node A DOWN event at t-2. As a result, the node A UP event can be processed completely without interruption through time t-3.

At 360, the present embodiment suspends processing of the new lifecycle operation until the active lifecycle operation has terminated. In this way, parallel processing of the new lifecycle operation and the active lifecycle operation is avoided. That is, through the implementation of locking the node when processing a lifecycle operation, all lifecycle operations associated with concurrent events can be processed sequentially. Sequential processing of the concurrent events is achieved through a queuing scheme, as will be described more fully below in relation to FIG. 5.

In another embodiment, the processing of the new lifecycle operation is suspended for a critical period of time. That is, if the node is locked, the new lifecycle operation is suspended until a critical time for processing the active lifecycle operation has expired. The critical period of time is of a sufficient period that ensures completion of the processing of the active lifecycle operation. That is, instead of waiting for the processing of the active lifecycle operation to complete, the present embodiment waits for a critical period of time, in which the active lifecycle operation is ensured of being processed, before beginning processing of the new lifecycle operation.

At 370, the present embodiment maintains the lock on the node event when the active lifecycle operation has terminated. This is to prevent parallel processing of other events while processing the new lifecycle operation.

At 380, the present embodiment processes the new lifecycle operation when the active lifecycle operation has terminated. That is, the new lifecycle operation begins processing after the active lifecycle operation has fully completed processing. In that way, the active and new lifecycle operations are processed sequentially.

For instance, returning to FIG. 4, the node A DOWN event begins processing at time t-4. This occurs after the completion of the critical period to process the node A UP event at time t-3. In this way, the node A UP event and the node A DOWN event are processed sequentially. The critical period for processing the node A DOWN event occurs at time t-5. Sequential processing of the node A UP event and the node A DOWN event ensures proper processing of the active and new lifecycle operations. In that way, the proper state for node A is recorded at time t-5 (e.g., node A is down).

Figure 5:
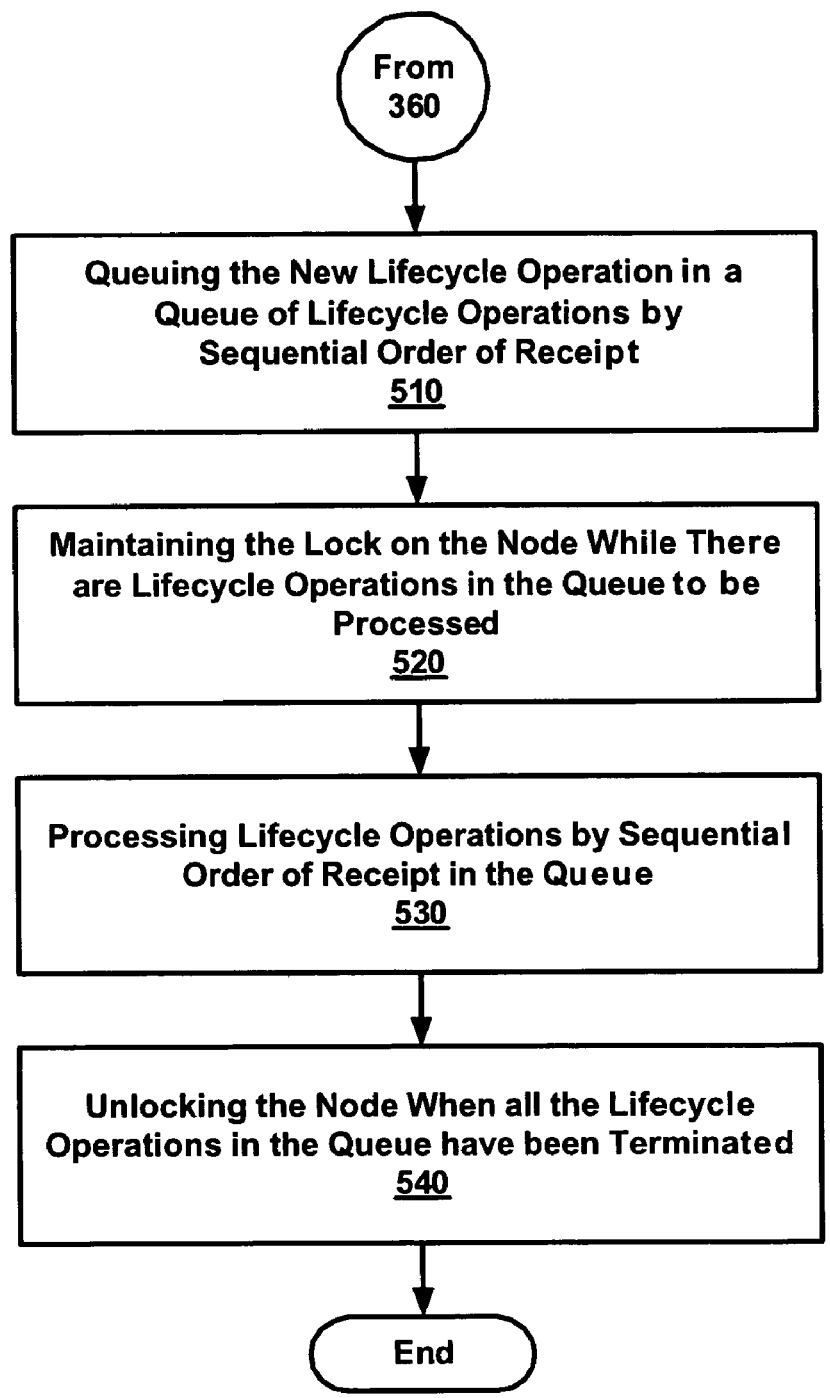
FIG. 5 is a flow chart illustrating steps in a computer implemented method for sequentially processing concurrent events in a provisional network that comprises a plurality of dynamically allocatable nodes, in accordance with one embodiment of the present invention.

Now referring to FIG. 5, a flow chart 500 is described illustrating steps in a computer implemented method for sequentially processing concurrent events in a provisional network that comprises a plurality of dynamically allocatable computing resources, in accordance with one embodiment of the present invention. Specifically, the method of flow chart 500 proceeds from 360 of flow chart 300. That is, when the present embodiment detects that the node is locked for processing an active lifecycle operation associated with a concurrent event, notification of which was previously received, a queue is implemented to ensure sequential processing of concurrent events for that node.

At 510, the present embodiment queues the new lifecycle operation in a queue of lifecycle operations after detecting that the node is locked. The order of events in the queue is by sequential order of receipt of respective notifications of events.

At 520, the present embodiment maintains the lock on the node while there are lifecycle operations in the queue to be processed. That is, the lock on the node is kept until all the lifecycle operations in the queue have been processed. This ensures that the concurrent events are not processed in parallel.

At 530, the present embodiment processes lifecycle operations in the queue in the sequential order. That is, the order that events are received into the queue is the same order that lifecycle operations associated with those events are processed.

At 540, the present embodiment unlocks the node when all of the lifecycle operations, associated with concurrent events, in the queue have been processed. This ensures that the node is not permanently locked.

Figure 6:
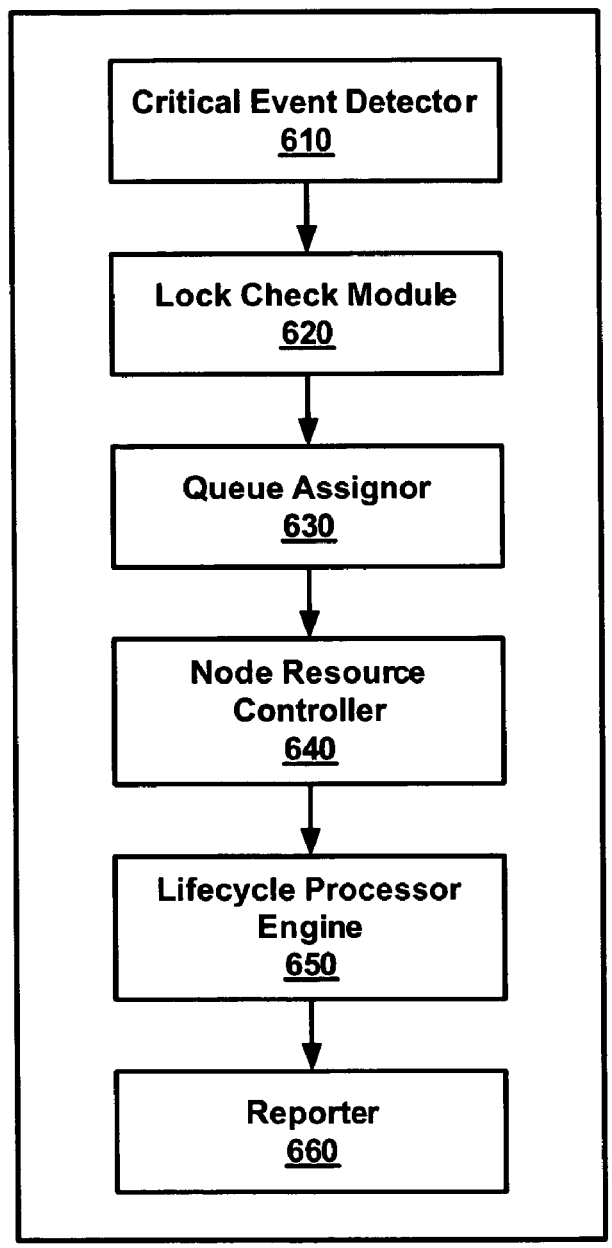
FIG. 6 is a block diagram of a system for processing events in a provisional network that comprises a plurality of dynamically allocatable nodes, in accordance with one embodiment of the present invention.

FIG. 6 is a block diagram of the event processing center 232 of FIG. 2, in accordance with one embodiment of the present invention. The event processing center 232 is capable of processing concurrent events in a provisional network. The event processing center 232 includes a critical event detector 610, a lock check module 620, a queue assigner 630, a node resource controller 640, a processor engine 650, and a reporter 660.

The critical event detector 610 receives notification of an event associated with a node in a provisional network that comprises a plurality of dynamically allocatable resources. The event requires processing of a new lifecycle operation, for instance to update a status of the node in the provisional network.

The event processing center 232 also includes a lock check module 620 that is communicatively coupled to the critical event detector 610. The lock check module 620 determines whether the node is locked for processing an active lifecycle operation that is associated with a concurrent event for the node. Notification of the concurrent event associated with the active lifecycle operation was received prior to the event associated with the new lifecycle operation.

The queue assigner 630 is communicatively coupled to the lock check module 620. If there are concurrent events, the queue assigner queues the new lifecycle operation, or alternatively the event, in a queue of lifecycle operations. Lifecycle operations in the queued are ordered sequentially by order of receipt into the event processing center 232, and alternatively, into the queue assigner 630. By queuing the lifecycle operations, and correspondingly the concurrent events, this ensures the respective lifecycle operations are processed sequentially.

The node resource controller 640 is communicatively coupled to the queue assigner 630. The node resource controller 640 controls the locking and unlocking of the node. For instance the node resource controller 640 locks the node while the event processing center 232 is processing an event, and unlocks the node when the event processing center 232 is not processing any events. Specifically, the node resource controller locks the node until all lifecycle operations in the queue have terminated.

The event processing center 232 also includes a lifecycle processor engine 650 communicatively coupled to the node resource controller 640. The lifecycle processor engine 650 processes lifecycle operations in the queue in sequential order. That is, the lifecycle operations are processed sequentially by order of receipt into the queue.

Additionally, a reporter 660 is communicatively coupled to the lifecycle processor engine 650. The reporter 660 is capable of reporting status on the node. In addition, the reporter 660 is able to produce a view of the concurrent events and their sequential order in the queue.

Also, a poller (not shown) can be communicatively coupled to the critical event detector 610. The poller polls each of the nodes in the plurality of allocatable nodes in the provisional network to prompt each of the nodes to send any notification of any events back to the event processing center 232.

While the methods of embodiments illustrated in flow charts 300 and 500 show specific sequences and quantity of steps, the present invention is suitable to alternative embodiments. For example, not all the steps provided for in the methods are required for the present invention. Furthermore, additional steps can be added to the steps presented in the present embodiment. Likewise, the sequences of steps can be modified depending upon the application.

A method and system for processing concurrent events in a provisional network that comprises a plurality of dynamically allocatable nodes is thus described. While the invention has been illustrated and described by means of specific embodiments, it is to be understood that numerous changes and modifications may be made therein without departing from the spirit and scope of the invention as defined in the appended claims and equivalents thereof. Furthermore, while the present invention has been described in particular embodiments, it should be appreciated that the present invention should not be construed as limited by such embodiments, but rather construed according to the below claims.

What is claimed is:

1. A utility data center (UDC) implemented method of processing concurrent events in a provisional network, comprising:
   receiving at a UDC notification of an event associated with a node in said provisional network, wherein said event requires processing a new lifecycle operation to update a status of said node in said provisional network, wherein said provisional network comprises a plurality of dynamically allocatable nodes;
   determining at said UDC whether said node is locked for processing an active lifecycle operation that is associated with a concurrent event for said node;
   suspending processing at said UDC of said new lifecycle operation until said active lifecycle operation has terminated, if said node is locked;
   maintaining at said UDC said lock on said node when said active lifecycle operation has terminated; and
   processing at said UDC said new lifecycle operation when said active lifecycle operation has terminated.

2. The UDC implemented method of claim 1, further comprising: unlocking at said UDC said node when said new lifecycle operation has terminated.

3. The UDC implemented method of claim 1, further comprising: locking at said UDC said node if said node is not locked; processing at said UDC said new lifecycle operation; and unlocking at said UDC said node when said new lifecycle operation has terminated.

4. The UDC implemented method of claim 1, further comprising: queuing at said UDC said new lifecycle operation in a queue of lifecycle operations by sequential order of receipt; maintaining at said UDC said lock on said node while there are lifecycle operations in said queue to be processed; and processing at said UDC lifecycle operations in said queue in said sequential order.

5. The UDC implemented method of claim 4, further comprising: unlocking at said UDC said node when all of said lifecycle operations in said queue have been processed.

6. The UDC implemented method of claim 1, wherein said receiving notification of an event further comprises: prompting at said UDC said node to send any notification of any events.

7. The UDC implemented method of claim 1, wherein said suspending processing further comprises: suspending processing at said UDC of said new lifecycle operation until a critical time for processing said active lifecycle operation has expired, if said node is locked.

8. The UDC implemented method of claim 1, further comprising: reporting at said UDC status of said node.

9. A utility data center (UDC) system for processing concurrent events in a provisional network, comprising:
   a critical event detector disposed within said UDC system for receiving notification of an event associated with a node in said provisional network, wherein said event requires processing a new lifecycle operation to update a status of said node in said provisional network, wherein said provisional network comprises a plurality of dynamically allocatable resources;
   a lock check module disposed within said UDC system communicatively coupled to said critical event detector for determining whether said node is locked for processing an active lifecycle operation that is associated with a concurrent event for said node;
   a queue assigner disposed within said UDC system communicatively coupled to said lock check module for queuing said new lifecycle operation in a queue of lifecycle operations by sequential order of receipt;
   a node resource controller disposed within said UDC system communicatively coupled to said queue assigner for locking said node until all lifecycle operations in said queue have terminated; and
   a lifecycle processor engine disposed within said UDC system communicatively coupled to said node resource controller for processing lifecycle operations in said queue in said sequential order.

10. The UDC system of claim 9, wherein said provisional network comprises:
    an operations center for providing overall control over said provisional network;
    a utility controller communicatively coupled to said operations center for allocating resources in said plurality of dynamically allocatable resources including said system for locking resources in said provisional network; and
    said plurality of dynamically allocatable resources.

11. The UDC system of claim 9, further comprising: a poller communicatively coupled to said critical event detector for polling said node to prompt said node to send any notification of any events.

12. The UDC system of claim 9, further comprising: a reporter communicatively coupled to said lifecycle processor engine for reporting status of said node.

13. The UDC system of claim 9, further comprising: a status database communicatively coupled to said lifecycle processor engine for storing the state of each of said plurality of dynamically allocatable resources.

14. The UDC system of claim 9, wherein each of said plurality of dynamically allocatable resources is taken from a group consisting of: computer system; network router; firewall; network switch; storage area network switch; and disk array.

15. A computer storage medium having embodied thereon a program, the program being executable by a computing device for performing a method for processing concurrent events in a provisional network, the method comprising:
    receiving notification of an event associated with a node in said provisional network, wherein said event requires processing a new lifecycle operation to update a status of said node in said provisional network, wherein said provisional network comprises a plurality of dynamically allocatable nodes;
    determining whether said node is locked for processing an active lifecycle operation that is associated with a concurrent event for said node;
    suspending processing of said new lifecycle operation until said active lifecycle operation has terminated, if said node is locked;
    maintaining said lock on said node when said active lifecycle operation has terminated; and
    processing said new lifecycle operation when said active lifecycle operation has terminated.

16. The computer storage medium of claim 15, further comprising: unlocking said node when said new lifecycle operation has terminated.

17. The computer storage medium of claim 15, further comprising: locking said node if said node is not locked; processing said new lifecycle operation; and unlocking said node when said new lifecycle operation has terminated.

18. The computer storage medium of claim 15, further comprising: queuing said new lifecycle operation in a queue of lifecycle operations by sequential order of receipt; maintaining said lock on said node while there are lifecycle operations in said queue to be processed; and processing lifecycle operations in said queue in said sequential order.

19. The computer storage medium of claim 15, further comprising: unlocking said node when all of said lifecycle operations in said queue have been processed.

20. The computer storage medium of claim 15, wherein in said receiving notification of an event further comprises prompting said node to send any notification of any events.

21. The computer storage medium of claim 15, wherein in said suspending processing said computer readable medium further comprises instructions for performing: suspending processing of said new lifecycle operation until a critical time for processing said active lifecycle operation has expired, if said node is locked.

22. The computer storage medium of claim 15, wherein said computer readable medium further comprises instructions for performing: reporting status of said node.

23. The computer storage medium of claim 15, further comprising queuing said new lifecycle operation in a queue of lifecycle operations by sequential order of receipt; maintaining said lock on said node while there are lifecycle operations in said queue to be processed; processing lifecycle operations in said queue in said sequential order; and unlocking said node when all of said lifecycle operations in said queue have been processed.

* * * * *